US011332096B2

(12) United States Patent
Hioda

(10) Patent No.: US 11,332,096 B2
(45) Date of Patent: May 17, 2022

(54) KNEE AIRBAG DEVICE

(71) Applicant: Toyota Jidosha Kabushiki Kaisha, Toyota (JP)

(72) Inventor: Seiji Hioda, Tokai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/103,065

(22) Filed: Nov. 24, 2020

(65) Prior Publication Data

US 2021/0162944 A1 Jun. 3, 2021

(30) Foreign Application Priority Data

Nov. 29, 2019 (JP) .............................. JP2019-217434

(51) Int. Cl.
| | |
|---|---|
| *B60R 21/206* | (2011.01) |
| *B60R 21/215* | (2011.01) |
| *B60R 21/2165* | (2011.01) |
| *B60R 21/231* | (2011.01) |
| B60R 21/237 | (2006.01) |
| B60R 21/217 | (2011.01) |
| B60R 21/00 | (2006.01) |

(52) U.S. Cl.
CPC .......... *B60R 21/231* (2013.01); *B60R 21/206* (2013.01); *B60R 21/215* (2013.01); *B60R 21/2165* (2013.01); *B60R 21/2171* (2013.01); *B60R 21/237* (2013.01); *B60R 2021/0051* (2013.01); *B60R 2021/23169* (2013.01)

(58) Field of Classification Search
CPC ... B60R 21/231; B60R 21/206; B60R 21/215; B60R 21/2165; B60R 21/2171; B60R 21/205; B60R 21/217; B60R 2021/23169; B60R 2021/0051; B60R 2021/0053
USPC .................. 280/728.2, 728.3, 730.1, 732
See application file for complete search history.

(56) References Cited

U.S. PATENT DOCUMENTS

| | | | | |
|---|---|---|---|---|
| 2003/0127838 A1* | 7/2003 | Freisler | ................. | B60R 21/205 280/732 |
| 2005/0116449 A1* | 6/2005 | Enders | .................. | B60R 21/206 280/730.1 |

(Continued)

FOREIGN PATENT DOCUMENTS

| | | |
|---|---|---|
| JP | 2013-119327 A | 6/2013 |
| JP | 2017-202769 A | 11/2017 |

*Primary Examiner* — Keith J Frisby
(74) *Attorney, Agent, or Firm* — Dinsmore & Shohl LLP

(57) ABSTRACT

A knee airbag device includes: an airbag case disposed at a lower face part of an instrument panel; a knee airbag accommodated within the airbag case in a folded state, the knee airbag inflating and deploying toward a vehicle rear side and a vehicle upper side upon being supplied with gas; and an airbag door part disposed at a vehicle lower side of the airbag case, the airbag door part having a substantially U-shaped rupture target part, the rupture target part is open toward a vehicle front side as seen in a plan view, at a portion, of a bottom wall part configuring a vehicle lower side face of the airbag door part, disposed rearward of an intermediate part of the airbag door part in a vehicle front-rear direction, and the portion of the bottom wall part disposed rearward of the intermediate part opening toward a vehicle lower side upon rupture of the rupture target part caused by inflation pressure of the knee airbag.

19 Claims, 9 Drawing Sheets

(56) References Cited

U.S. PATENT DOCUMENTS

2017/0327071 A1   11/2017  Maeda et al.
2018/0065586 A1*  3/2018   Takebayashi ......... B60R 21/206
2020/0238938 A1*  7/2020   Kang ................... B60R 21/206

* cited by examiner

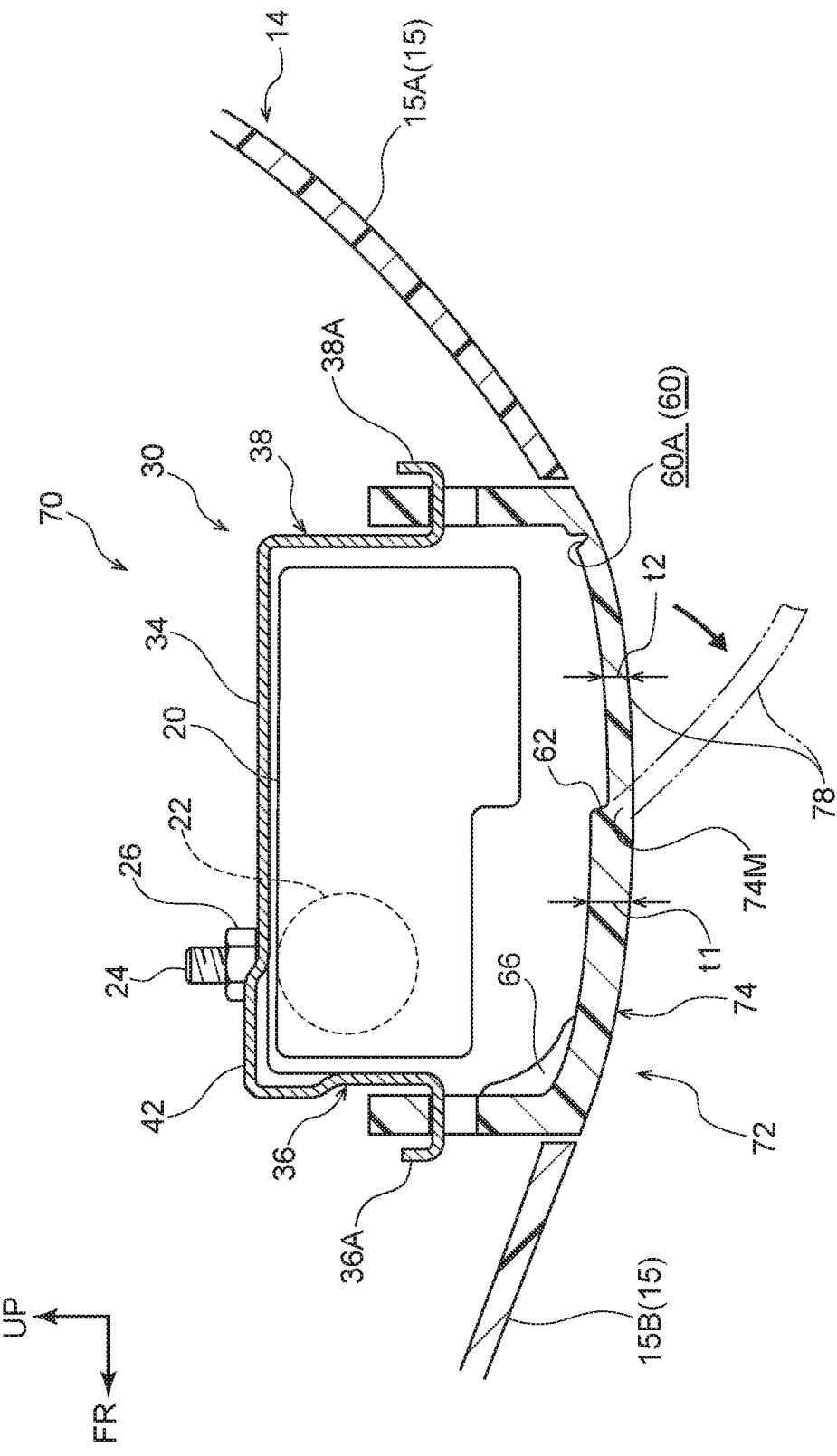

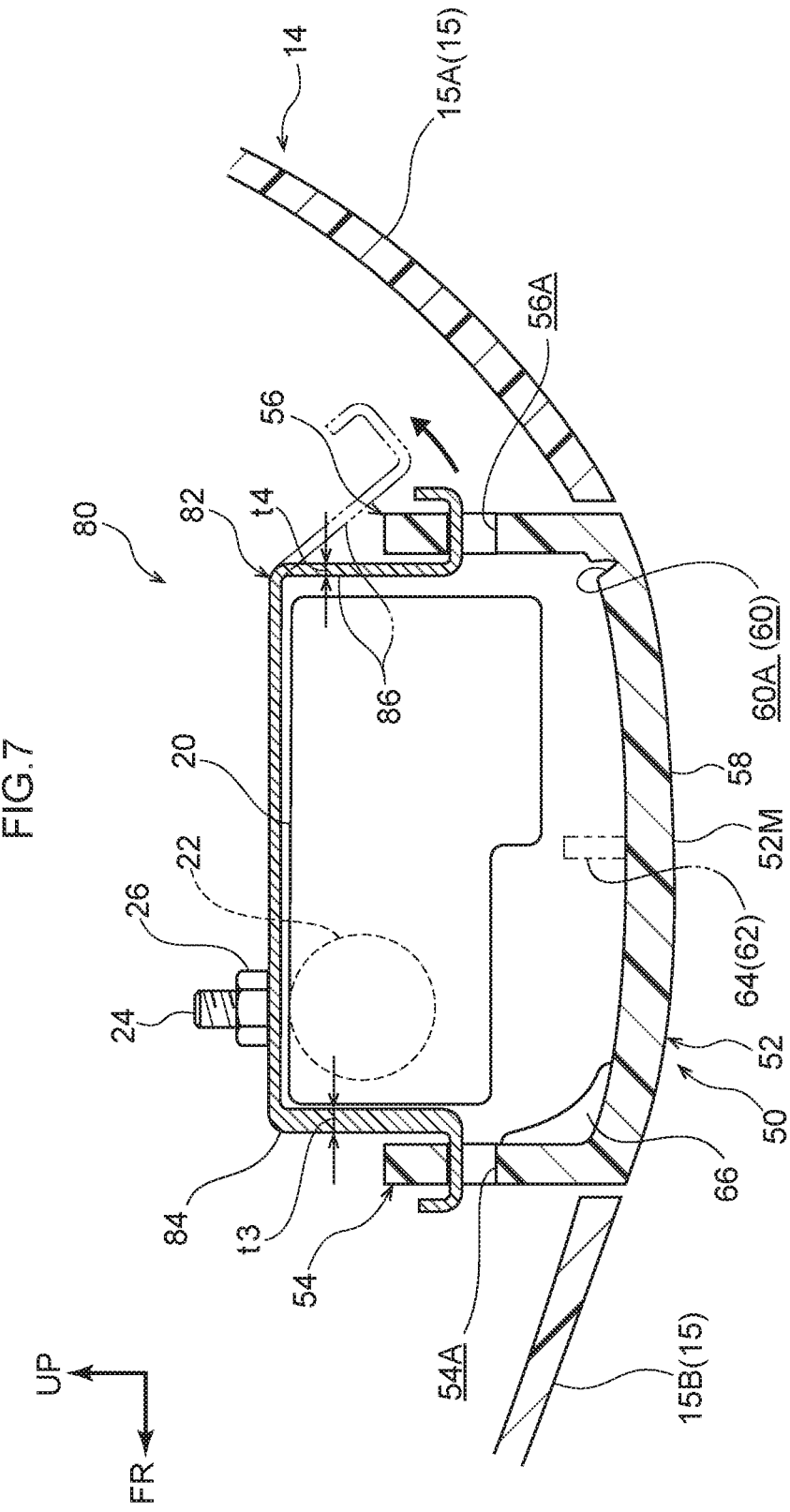

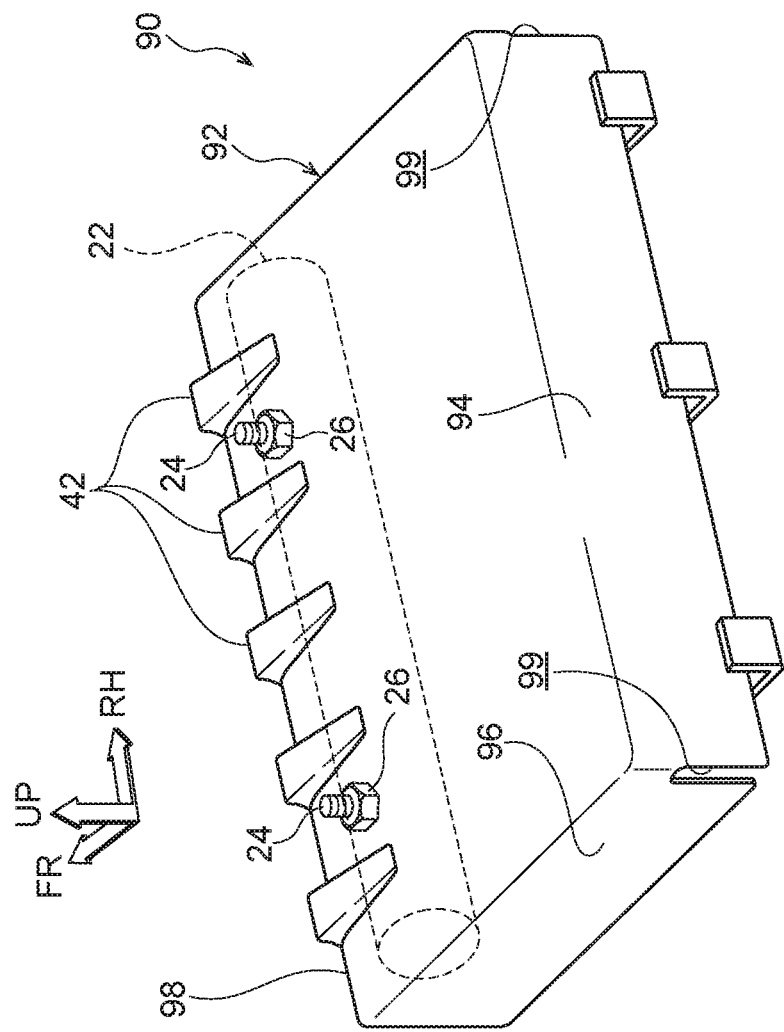

KNEE AIRBAG DEVICE

CROSS-REFERENCE TO RELATED APPLICATION

This application is based on and claims priority under 35 USC 119 from Japanese Patent Application No. 2019-217434 filed on Nov. 29, 2019, the disclosure of which is incorporated by reference herein.

BACKGROUND

Technical Field

The present disclosure relates to a knee airbag device.

Related Art

Japanese Patent Application Laid-open No. 2017-202769 discloses a structure in which a knee airbag device is mounted at a lower surface portion of an instrument panel arranged at a front of a passenger compartment. This knee airbag device includes a box-shaped airbag case portion, and a knee airbag and an inflator are housed inside the airbag case portion.

A knee airbag is inflated and deployed toward an upper side of a vehicle along a vertical wall portion that is a design surface of the instrument panel, and the knee airbag is arranged between the instrument panel and a knee portion of an occupant. However, when the knee airbag device is mounted at the lower surface portion of the instrument panel, the knee airbag is inflated and deployed toward a vehicle rear side and a vehicle upper side along the lower surface portion and the vertical wall portion. For this reason, a configuration is provided for preventing a reduction in robustness at the time of inflation and deployment, as compared with a configuration in which the knee airbag is inflated and deployed along the vertical wall portion toward the vehicle upper side.

Here, the configuration is such that an airbag door portion is provided on a vehicle lower side of the above-described airbag case portion, and substantially an entire bottom wall portion serves as a door portion, which is opened to the vehicle lower side in a single opening by the inflation pressure of the knee airbag. As a result, the knee airbag that inflates and deploys toward the vehicle rear side and the vehicle upper side along the instrument panel can obtain a reaction force from the door portion.

However, the technique described in Japanese Patent Application Laid-Open No. 2017-202769 does not include a configuration for restricting the opening angle of the door portion. Therefore, when the door portion is opened more than necessary, it is difficult to apply a sufficient reaction force to the knee airbag toward the vehicle rear side and the vehicle upper side.

Therefore, the above-mentioned conventional technique has room for improvement in terms of the reaction force being effectively obtained from the door portion to improve the robustness when the knee airbag is inflated and deployed.

SUMMARY

In consideration of the above facts, the present disclosure has an object to obtain a knee airbag device capable of improving robustness when the knee airbag is inflated and deployed.

A knee airbag device according to a first aspect of the present disclosure includes: an airbag case disposed at a lower face part of an instrument panel; a knee airbag accommodated within the airbag case in a folded state, the knee airbag inflating and deploying toward a vehicle rear side and a vehicle upper side upon being supplied with gas; and an airbag door part disposed at a vehicle lower side of the airbag case, the airbag door part having a substantially U-shaped rupture target part, which is open toward a vehicle front side as seen in plan view, at a portion, of a bottom wall part configuring a vehicle lower side face of the airbag door part, disposed rearward of an intermediate part in a vehicle front-rear direction, and the portion of the bottom wall part disposed rearward of the intermediate part opening toward a vehicle lower side upon rupture of the rupture target part caused by inflation pressure of the knee airbag.

The knee airbag device according to the first aspect of the present disclosure includes an airbag case and an airbag door part. The airbag case is arranged at a lower face part of the instrument panel. The airbag door part is arranged at a vehicle lower side of the airbag case portion. The knee airbag is stored in the airbag case in a folded state. When the knee airbag is supplied with gas, the rupture target part of the airbag door part is ruptured by the inflation pressure. Then, the knee airbag is inflated and deployed along the instrument panel toward the vehicle rear side and the vehicle upper side. As a result, the inflated and deployed knee airbag is arranged between the instrument panel and the knee portion of the occupant As a result, the knee airbag can restrain and protect the lower limbs of the occupant.

Here, the rupture target part is formed at a portion at a rear side of an intermediate part in the vehicle front-rear direction of the bottom wall part of the airbag door part. Further, the rupture target part has a substantially U-shape that is open to the vehicle front side in a plan view. That is, when the rupture target part is ruptured by the inflation pressure of the knee airbag, a side to the rear of the intermediate part of the bottom wall part opens to the vehicle lower side to configure a door portion. Accordingly, when the knee airbag is inflated and deployed, a part of a load in the vehicle downward direction input from the knee airbag to the bottom wall part can be received at the vehicle front side of the intermediate part. Thereby, the expanding action of the knee airbag is guided rearward of the intermediate part of the bottom wall part. Further, when the rupture target part of the bottom wall part is ruptured and the intermediate part is bent and deformed to open the door part, a part of the load input from the knee airbag to the door part can be absorbed. As a result, the opening angle of the door part is regulated as compared with a configuration in which the entire area of the bottom wall part is ruptured to form the door part. As a result, a reaction force can be applied to the knee airbag from the door part toward the vehicle rear side and the vehicle front side, whereby robustness at the time of inflation and deployment is improved.

A knee airbag device according to a second aspect of the present disclosure is the knee airbag device according to the first aspect, in which a first rib is formed at the bottom wall part, the first rib being disposed at a vehicle front side of a vehicle front side end part of the rupture target part and in proximity to the vehicle front side end part of the rupture target part, and extending along a vehicle width direction.

In the knee airbag device according to the second aspect of the present disclosure, the first rib is arranged closer to the vehicle front side than a vehicle front side end part of the rupture target part, and in proximity to this end part, at the bottom wall part. In addition, the first rib extends along the vehicle width direction. As a result, in the bottom wall part, since the vicinity of a region corresponding to a hinge part of the door portion is reinforced by the first rib, it is possible to prevent or suppress a situation in which the bottom wall part is ruptured toward the vehicle front side beyond the rupture target part by the inflation pressure of the knee airbag.

A knee airbag device according to a third aspect of the present disclosure is the knee airbag device according to the first aspect, in which the bottom wall part is configured such that a plate thickness of a portion at a vehicle front side of the intermediate part is larger than a plate thickness of a portion at a vehicle rear side of the intermediate part.

In the knee airbag device according to the third aspect of the present disclosure, in the bottom wall part, the plate thickness of the portion at the vehicle front side of the intermediate part in the vehicle front-rear direction is made larger than that of the portion at the vehicle rear side of the intermediate part. That is, the plate thickness of the portion of the bottom wall part at the vehicle front side is made larger than the plate thickness of the portion at the rear side at which the rupture target part is formed. Therefore, in the bottom wall part, the portion at the vehicle front side of the intermediate part has higher rigidity than the portion at the vehicle rear side of the intermediate part. As a result, when the door part of the bottom wall part opens, the rigidity of the portion at the vehicle front side is higher than that of the portion corresponding to the hinge part of the bottom wall part. As a result, it is possible to prevent the bottom wall part from being ruptured beyond the rupture target part by the inflation pressure of the knee airbag.

A knee airbag device according to a fourth aspect of the present disclosure is the knee airbag device according to any one of the first to third aspects, in which the bottom wall part is configured in a dome shape that is convex toward a vehicle lower side.

In the knee airbag device according to the fourth aspect of the present disclosure, the bottom wall part is formed in a dome shape that is convex toward the vehicle lower side. As a result, it is possible to suppress an increase in the plate thickness of the bottom wall part as compared with a configuration in which the bottom wall part is formed in a flat plate shape. As a result, an increase in the weight of the airbag door part can be suppressed. Further, it is possible to increase resistance when the intermediate part of the bottom wall part is bent and deformed. As a result, the opening angle of the door part can be regulated.

A knee airbag device according to a fifth aspect of the present disclosure is the knee airbag device according to any one of the first to fourth aspects, in which the airbag case is configured such that a proof stress, relative to inflation pressure of the knee airbag, of a front wall configuring a vehicle front side wall of the airbag case is higher than a proof stress, relative to inflation pressure of the knee airbag, of a rear wall configuring a vehicle rear side wall of the airbag case.

In the knee airbag device according to the fifth aspect of the present disclosure, in a case in which the inflation pressure of the knee airbag acts on the front wall and the rear wall of the airbag case, the rear wall side, having low yield strength, can be deformed to the vehicle rear side. As a result, the door opening formed in the bottom wall part after rupture of the rupture target part is enlarged toward the vehicle rear side in conjunction with deformation of the rear wall. As a result, the knee airbag can easily inflate and deploy toward the vehicle rear side and the vehicle upper side.

A knee airbag device according to a sixth aspect of the present disclosure is the knee airbag device according to any one of the first to fifth aspects in which the airbag door part includes a second rib extending across from the bottom wall part to a front vertical wall part that stands upright toward a vehicle upper side from an end part at a vehicle front side of the bottom wall part.

In the knee airbag device according to the sixth aspect of the present disclosure, the boundary portion between the bottom wall part and the front vertical wall part of the airbag door part is reinforced by a second rib. As a result, the deformation resistance of the bottom wall part to the inflation pressure of the knee airbag is increased in the portion of the bottom wall part that is on the front side of the intermediate part in the vehicle front-rear direction. As a result, a larger amount of inflation pressure can be received in the portion of the bottom wall part that is on the front side of the intermediate part, so that the reaction force applied from the bottom wall part to the knee airbag is increased. As a result, robustness during inflation and deployment is improved.

The knee airbag device according to the first aspect has the effect that the robustness at the time of inflating and deploying the knee airbag can be improved.

The knee airbag device according to the second aspect and the third aspect has the effect that it is possible to prevent or suppress a situation in which the bottom wall is ruptured by the inflation pressure of the knee airbag beyond the rupture target part.

The knee airbag device according to the fourth aspect has the effect that the opening angle of the door part in the airbag door part can be regulated and, further, an increase in the weight of the airbag door part can be suppressed.

The knee airbag device according to the fifth aspect has the effect that the knee airbag can be smoothly deployed between the instrument panel and the knees of the occupant.

The knee airbag device according to the sixth aspect has the effect that the reaction force applied to the knee airbag from the bottom wall part can be increased and the robustness at the time of inflation and deployment of the knee airbag can be improved.

BRIEF DESCRIPTION OF THE DRAWINGS

Exemplary embodiments of the present disclosure will be described in detail based on the following figures, wherein:

FIG. 6 is an enlarged cross-sectional view of a knee airbag device corresponding to FIG. 3, showing a first modification of the present embodiment;

FIG. 7 is an enlarged cross-sectional view of a knee airbag device corresponding to FIG. 3, showing a second modification of the present embodiment;

FIG. 8 is an enlarged perspective view of the knee airbag device corresponding to FIG. 2, showing a third modification of the present embodiment;

DETAILED DESCRIPTION

Hereinafter, the knee airbag device 10 according to the present embodiment will be described with reference to FIGS. 1 to 5. Arrow FR shown as appropriate in the respective drawings indicates a vehicle forward side, arrow UP indicates a vehicle upward side, and arrow RH indicates a vehicle right side. Furthermore, unless otherwise specified, when the directions of front/rear, up/down, and left/right are used in the following description, these will be understood to mean front/rear in the vehicle front-rear direction, up/down in the vehicle vertical direction, and left/right when facing the direction of forward travel.

Figure 1:
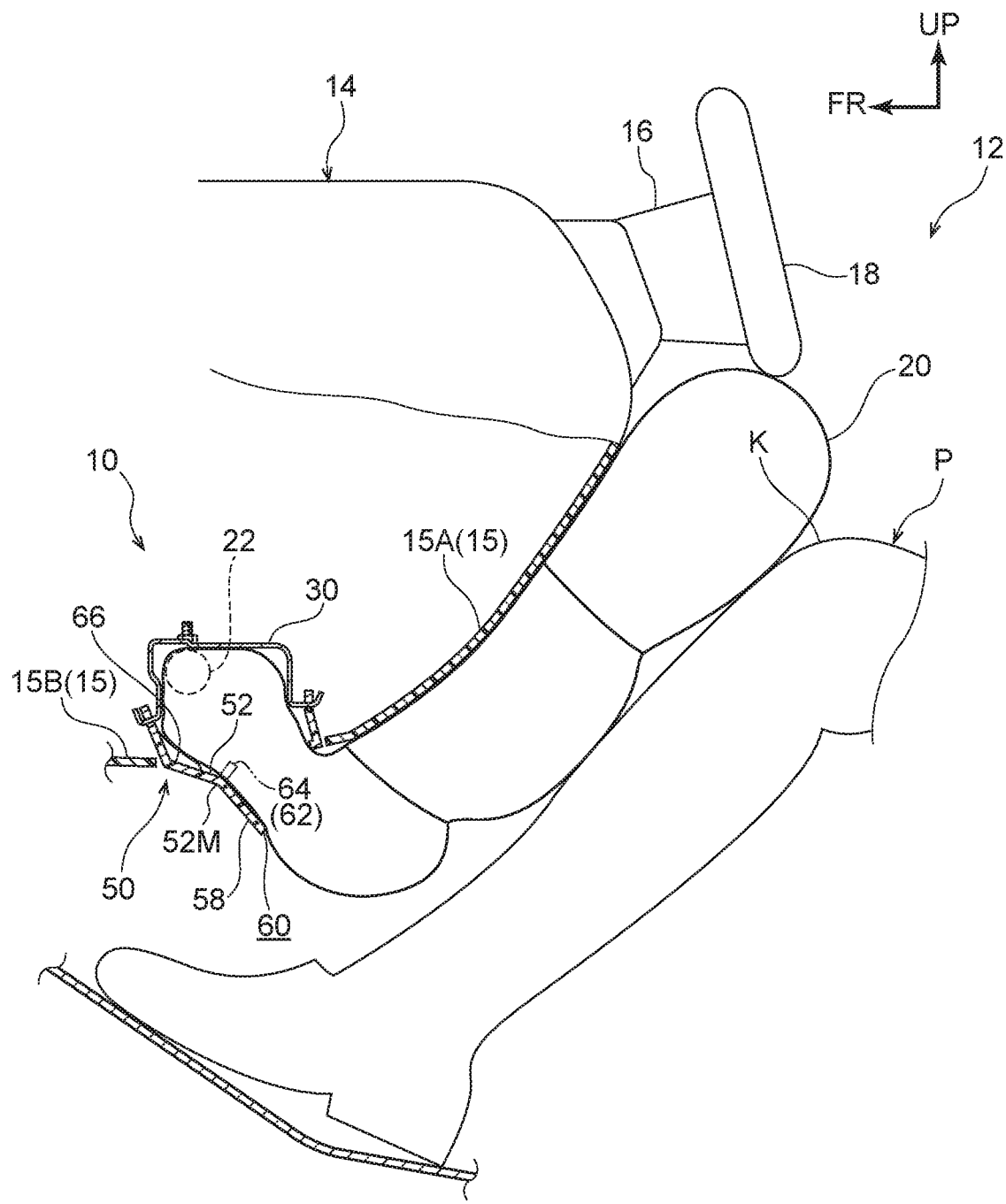
FIG. 1 is a schematic cross-sectional view of a knee airbag device according to the present embodiment, schematically showing a state where inflation and deployment of the knee airbag is complete.

As illustrated in FIG. 1, the knee airbag device 10 of the present exemplary embodiment is disposed at an instrument panel 14 that is made of resin and that is provided at the front portion of the vehicle cabin of a vehicle 12. The instrument panel 14 is configured to include an upper panel and a lower panel 15. The upper panel constitutes the upper part of the instrument panel 14. The lower panel 15 constitutes a lower portion of the instrument panel 14. A steering wheel 18 is arranged on the driver's seat side of the upper panel via a steering column 16. In addition, in FIG. 1, the reference numeral of the upper panel is omitted.

The lower panel 15 of the instrument panel 14 includes a vertical wall portion 15A and a lower surface portion 15B. The vertical wall portion 15A is a vertical wall that is inclined toward the vehicle front side on progression toward the vehicle lower side when viewed from the vehicle width direction. The lower surface portion 15B extends from the lower end of the vertical wall portion 15A toward the vehicle front side. The knee airbag device 10 is arranged at the lower surface portion 15B. In the knee airbag device 10, when an inflator 22, described below, is activated, a knee airbag 20 inflates and deploys toward the vehicle rear side and the vehicle upper side along the surfaces of the lower surface portion 15B and the vertical wall portion 15A of the lower panel 15 at the vehicle interior side. Knee portions K of a vehicle occupant P at the driver's seat side are protected by the knee airbag 20 that has inflated and deployed.

As shown in FIG. 1, the knee airbag device 10 includes the knee airbag 20, an inflator 22, the airbag case 30, and an airbag door portion 50 as main components.

Figure 2:
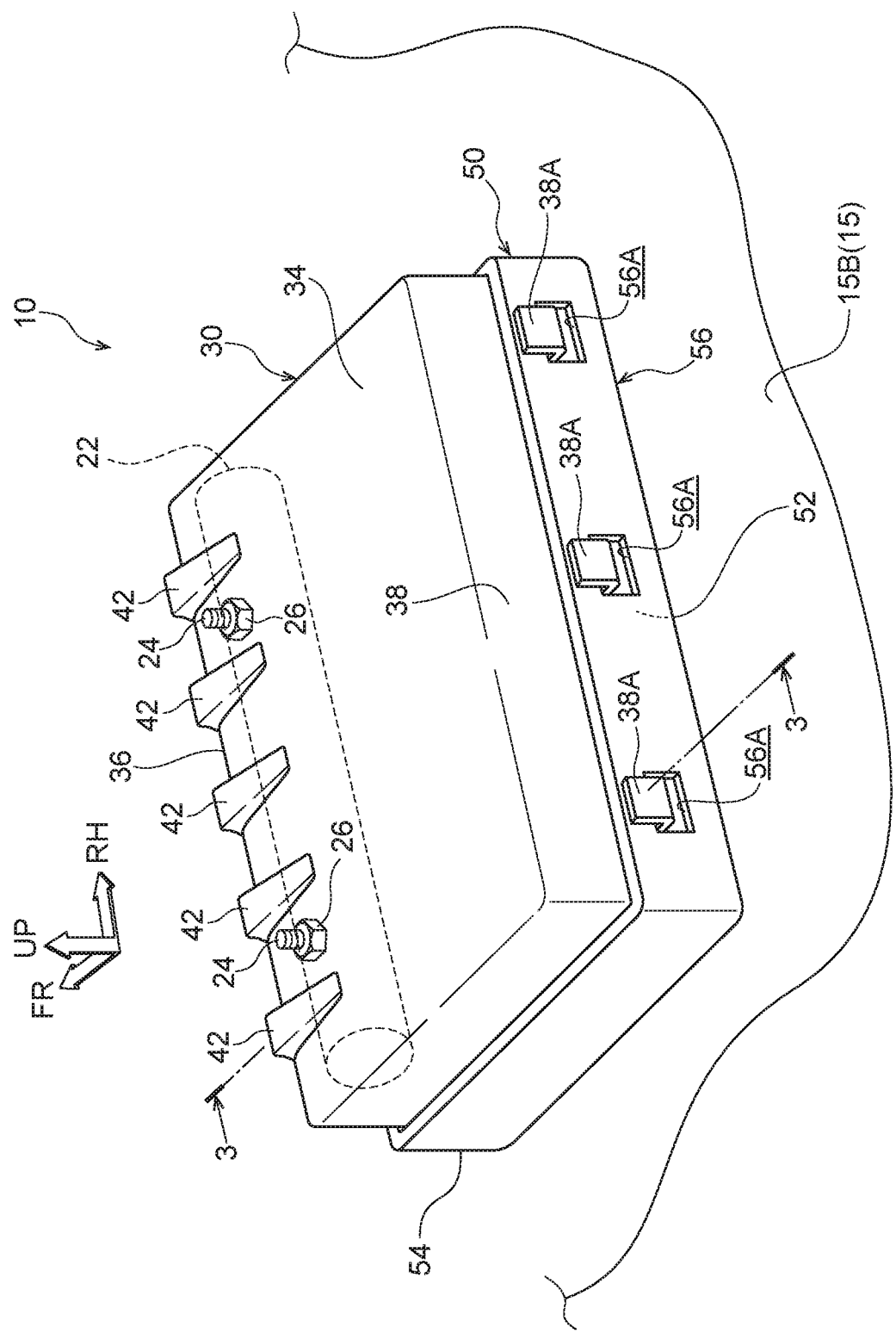
FIG. 2 is an enlarged perspective view of the knee airbag device shown in FIG. 1, in which the knee airbag is in a state before being inflated and deployed, as viewed from a diagonally rear side of the vehicle.
Figure 3:
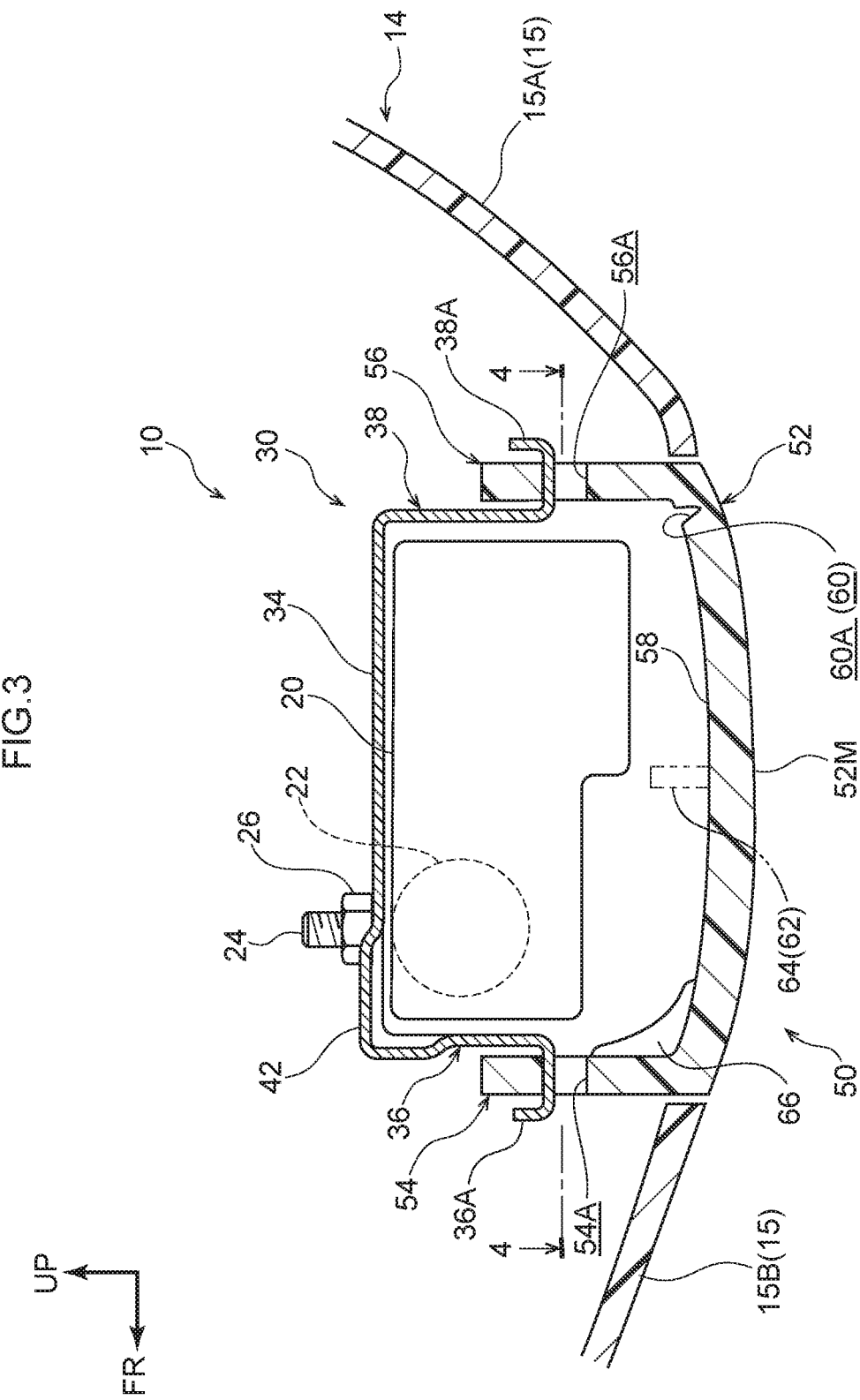
FIG. 3 is an enlarged cross-sectional view of the knee airbag device in a state of being cut along the line 3-3 in FIG. 2.

As shown in FIGS. 2 and 3, the knee airbag 20 is stored in a folded state in the airbag case 30 arranged inside the lower surface portion 15B of the lower panel 15. The knee airbag 20 is formed in the shape of a thin-type bag by the outer peripheral portions of a plurality of base cloths being sewn together, and inflates and deploys due to gas being supplied to the interior thereof.

Figure 5:
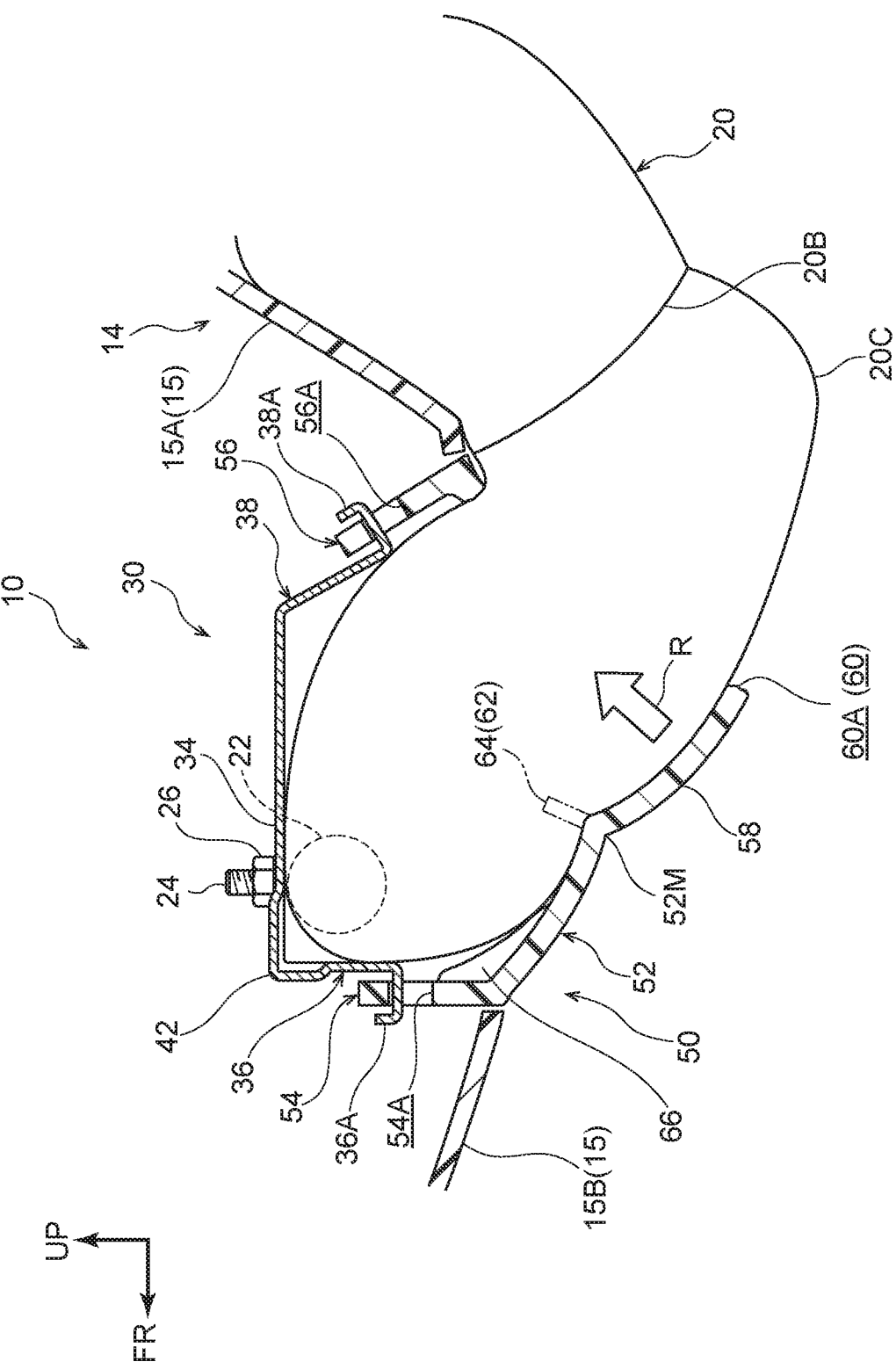
FIG. 5 is an enlarged cross-sectional view of the knee airbag device corresponding to FIG. 3, showing a state after the knee airbag is inflated and deployed.

As shown in FIG. 5, the inner space of the lower portion of the knee airbag 20 is divided into front and rear by a plurality of tethers 20B. A tuck 20C is provided between the tether and the tether 20B. Due to the tuck 20C deploying at the time when the knee airbag 20 inflates and deploys, a difference in the peripheral lengths of the knee airbag 20 arises at the vehicle front side and the vehicle rear side thereof, and the bent state thereof is maintained. Namely, an end portion of the knee airbag 20 is configured such that it can be inflated and deployed toward the vehicle rear side and the vehicle upper side along the lower surface portion 15B and the vertical wall portion 15A.

As shown in FIGS. 2 and 3, the inflator 22 is provided inside the airbag case 30 in a state of being housed inside the knee airbag 20. The inflator 22 is disposed at the vehicle front side end portion of the interior of the airbag case 30. Specifically, the inflator 22 is fixed to an end portion on the vehicle front side of a bottom wall 34 that constitutes a vehicle upper side wall of the airbag case 30. The inflator 22 is a cylinder-type inflator, and is formed substantially in the shape of a cylindrical tube whose length direction is the vehicle transverse direction. Further, the inflator 22 is provided with an ignition part and a gas injection part, which are not shown. When the inflator 22 is actuated, the ignition part is ignited, and gas is supplied from the gas injection part to the inside of the knee airbag 20.

The inflator 22 is electrically connected to a control unit such as an ECU (not shown). Note that ECU is an abbreviation for Electronic Control Unit. When a collision of the vehicle is sensed, or when a collision of the vehicle is predicted, the inflator 22 is operated by a signal from the control section.

Further, the inflator 22 is provided with a stud bolt 24 protruding from an outer peripheral portion toward the vehicle upper side. The stud bolt 24 penetrates the knee airbag 20 and the bottom wall 34 of the airbag case 30 in this order. Further, a nut 26 is screwed onto the tip of the stud bolt 24. As a result, the inflator 22 is fixed to the airbag case 30. In this state, the greater part of the knee airbag 20 is disposed further toward the vehicle rear side than the inflator 22. As a result, the inflation pressure of the knee airbag 20 effectively acts on a rupture target part or planned cleavage portion 60, which is described below. A stay (not shown) is arranged on the upper surface side of the bottom wall 34 of the airbag case 30. The airbag case 30 and the stay are fastened together by the stud bolt 24 and the nut 26. As a result, the knee airbag device 10 is supported by an instrument panel reinforcement (not shown).

Figure 4:
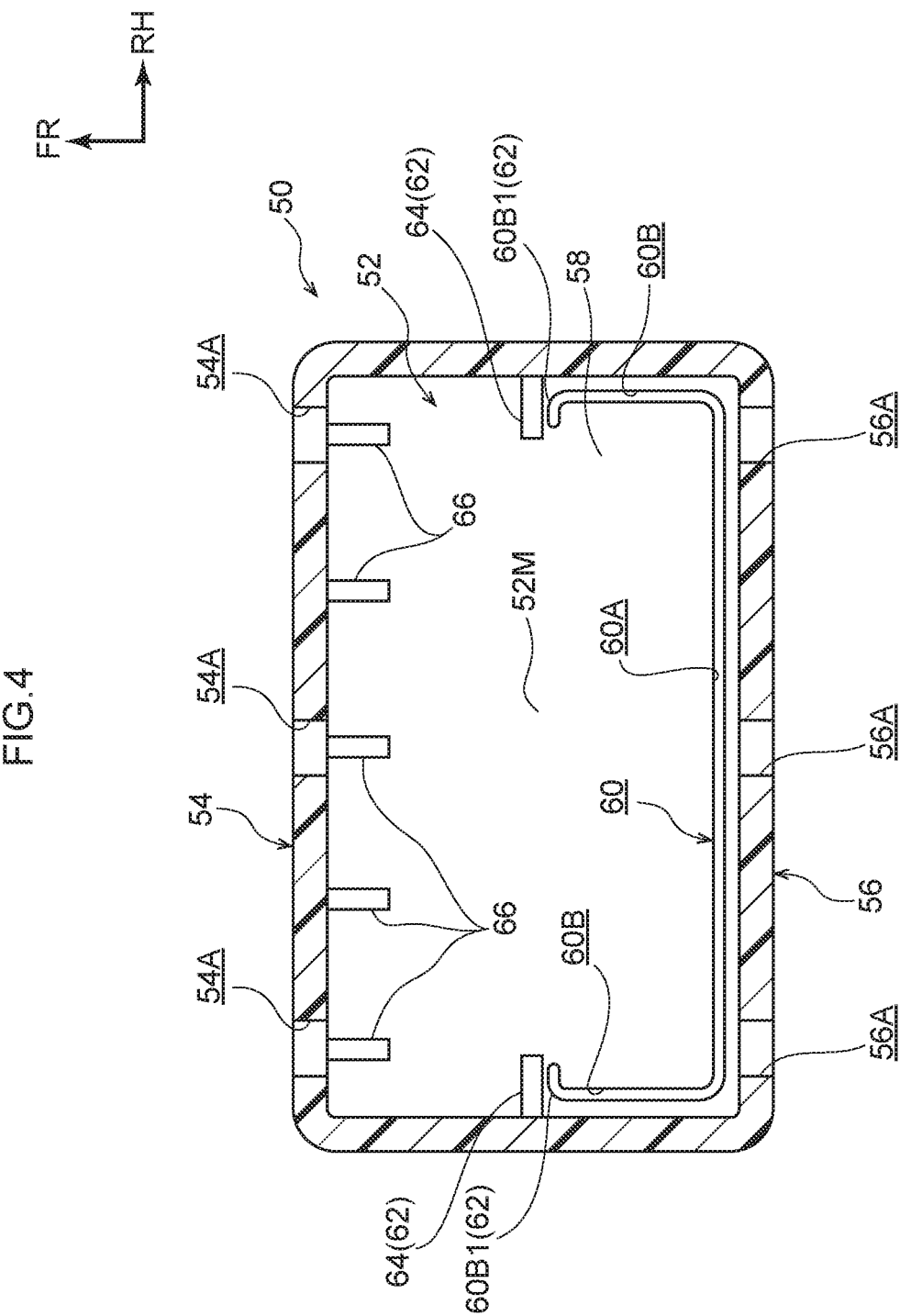
FIG. 4 is an enlarged cross-sectional view showing a state where the airbag door portion shown in FIG. 3 is cut along the line 4-4 in FIG. 3.

As shown in FIGS. 2 to 4, the airbag case 30 is made of a metal material. The airbag case 30 constitutes the vehicle upper side of the knee airbag device 10, and is formed in a substantially box shape opened to the vehicle lower side. More specifically, the airbag case 30 includes the bottom wall 34, a front wall 36, and a rear wall 38.

The bottom wall 34 constitutes a wall of the airbag case 30 on the vehicle upper side. Two through holes (not shown) through which the stud bolts 24 of the inflator 22 are inserted are formed in the vehicle front portion of the bottom wall 34 at intervals in the vehicle width direction.

The front wall 36 extends from the end of the bottom wall 34 at the vehicle front side toward the vehicle lower side. The front wall 36 constitutes a wall of the airbag case 30 at the vehicle front side. The front wall 36 is provided with a plurality of hook-shaped front engagement portions 36A at the lower end thereof, and the front engagement portions 36A are engaged with the airbag door portion 50.

The rear wall 38 extends from the end of the bottom wall 34 at the vehicle rear side toward the vehicle lower side. The rear wall 38 constitutes a wall of the airbag case 30 at the vehicle rear side. The rear wall 38 is provided with a plurality of hook-shaped rear engagement portions 38A at the lower end thereof, and the rear engagement portions 38A are engaged with the airbag door portion 50.

Further, the airbag case 30 is provided with a plurality of beads 42 at a front portion of the vehicle. The a plurality of beads 42 are formed so as to straddle the bottom wall 34 and the front wall 36 of the airbag case 30. Further, the a plurality of beads 42 are arranged at a predetermined interval in the vehicle width direction. These beads 42 enhance the rigidity of the boundary portion between the bottom wall 34 and the front wall 36 and enhance the proof stress of the front wall 36 against the inflation pressure of the knee airbag 20. As a result, in the airbag case 30, the proof stress of the front wall 36 against the inflation pressure of the knee airbag 20 is set higher than the proof stress of the rear wall 38. In the present embodiment, as shown in FIG. 5, the proof stress of the front wall 36 and the rear wall 38 is adjusted so that only the rear wall 38 is deformed toward the vehicle rear side by the inflation pressure of the knee airbag 20.

On the other hand, the airbag door portion 50 that constitutes the vehicle lower side of the knee airbag device 10 is made of a resin material. The airbag door portion 50 is formed in a substantially box shape that is open to the vehicle upper side. More specifically, the airbag door portion 50 is configured to include a bottom wall portion 52, a front vertical wall portion 54, and a rear vertical wall portion 56. The airbag door portion 50 is arranged inside an opening formed in the lower surface portion 15B of the instrument panel 14. The airbag door portion 50 is configured separately from the instrument panel 14. That is, the knee airbag device 10 and the instrument panel 14 are separately configured. As a result, the knee airbag device 10 is modularized.

The bottom wall portion 52 constitutes a wall of the airbag door portion 50 on the vehicle lower side. The bottom wall portion 52 is formed in a flattened dome shape that is convex toward the vehicle lower side.

The front vertical wall portion 54 is provided upright from the vehicle front side end of the bottom wall portion 52 toward the vehicle upper side. The front vertical wall portion 54 constitutes a vehicle front side wall of the airbag door portion 50. The front vertical wall portion 54 is provided with three front latch portions 54A penetrating in the plate thickness direction at predetermined intervals in the vehicle width direction. A plurality of front engagement portions 36A provided at the airbag case 30 are engaged with these front latch portions 54A.

The rear vertical wall portion 56 stands upright from the end portion of the bottom wall portion 52 on the vehicle rear side toward the vehicle upper side. The rear vertical wall portion 56 constitutes a vehicle rear side wall of the airbag door portion 50. The rear vertical wall portion 56 is provided with three rear latch portions 56A penetrating in the plate thickness direction at predetermined intervals in the vehicle width direction. A plurality of rear engagement portions 38A provided at the airbag case 30 are engaged with these rear latch portions 56A.

Here, as shown in FIGS. 3 and 4, in the airbag door portion 50 having the above-described configuration, a door portion 58 is provided at the rear side of the intermediate portion 52M of the bottom wall portion 52 in the vehicle front-rear direction. Normally, the door portion 58 is integrated with the bottom wall portion 52 via the planned cleavage portion 60 formed along the peripheral edge of the door portion 58. When the planned cleavage portion 60 is ruptured by the inflation pressure of the knee airbag 20, the door portion 58 is separated from the bottom wall portion 52; that is, the door portion 58 is ruptured and opened to the vehicle lower side.

The planned cleavage portion 60 is known as a tear line. The planned cleavage portion 60 is formed by providing the bottom wall portion 52 with a notch formed of a V groove. Further, the planned cleavage portion 60 has a substantially U-shape that is open to the vehicle front side in a plan view. In addition, the scheduled cleavage portion may be formed by a plurality of small holes arranged in a perforated fashion. That is, the planned cleavage portion 60 may be formed by arranging a plurality of small holes penetrating the bottom wall portion 52 in the plate thickness direction in a perforated shape having a U shape in plan view.

The planned cleavage portion 60 of this embodiment will be described more specifically. As shown in FIG. 4, the planned cleavage portion 60 includes a first planned cleavage portion 60A extending in the vehicle width direction along the edge of the bottom wall portion 52 on the vehicle rear side. In addition, the planned cleavage portion 60 includes second planned cleavage portions 60B extending from either end of the first planned cleavage portion 60A in the vehicle width direction toward the vehicle front side. An end portion 60B1 on the vehicle front side of the second planned cleavage portion 60B is bent inward in the vehicle width direction from the intermediate portion 52M of the bottom wall portion 52. When the planned cleavage portion 60 is cleaved or ruptured by the inflation pressure of the knee airbag 20, the door portion 58 is bent and deformed along the vehicle width direction starting from the pair of end portions 60B1 of the planned cleavage portion 60. As a result, the door portion 58 opens to the lower side of the vehicle. In other words, the end portion 60B1 of the planned cleavage portion 60 functions as a hinge portion 62 having the vehicle width direction as the rotation axis direction.

Further, on the vehicle front side of the pair of end portions 60B1 in the planned cleavage portion 60, a pair of first ribs 64 extending along the vehicle width direction are arranged close to the respective end portions 60B1. The pair of first ribs 64 are integrally formed across the bottom wall portion 52 of the airbag door portion 50 and the left and right side wall portions that are erected from both end portions of the bottom wall portion 52 in the vehicle width direction to the vehicle upper side. Therefore, the vicinity of the end portion 60B1 of the planned cleavage portion 60 in the bottom wall portion 52 is reinforced by the first rib 64. The first rib 64 effectively reinforces the vicinity of the hinge portion 62 provided at the end portion 60B1 where stress is concentrated on receipt of the inflation pressure of the knee airbag 20, in the bottom wall portion 52. As a result, the bottom wall portion 52 is prevented from being ruptured beyond the planned cleavage portion 60.

Further, the airbag door portion 50 is provided with five second ribs 66 at the vehicle front portion of the bottom wall portion 52. These second ribs 66 are formed so as to straddle the bottom wall portion 52 and the front vertical wall portion 54. Further, these second ribs 66 are arranged at a predetermined interval in the vehicle width direction. The airbag door portion 50 is provided with the second ribs 66 to increase the rigidity of the boundary portion between the bottom wall portion 52 and the front vertical wall portion 54. As a result, in the portion of the bottom wall portion 52 at the front side of the intermediate portion 52M, the proof strength against the inflation pressure of the knee airbag 20 is increased.

Next, the action and effects of the present embodiment will be explained.

The knee airbag device 10 of the present embodiment is provided with an airbag case 30 arranged at the lower surface portion 15B of the instrument panel 14, and an airbag door portion 50 arranged at the vehicle lower side of the airbag case 30. The knee airbag 20 is stored in the airbag case 30 in a folded state. When the knee airbag 20 is supplied with gas, the planned cleavage portion 60 of the airbag door portion 50 is ruptured or cleaved by the inflation pressure. Then, the knee airbag 20 is inflated and deployed along the instrument panel 14 toward the vehicle rear side and the vehicle upper side. As a result, the inflated and deployed knee airbag 20 is arranged between the instrument panel 14 and the knee portion K of the occupant P. As a result, the knee airbag 20 can restrain and protect the lower limbs of the occupant P.

Figure 9A:
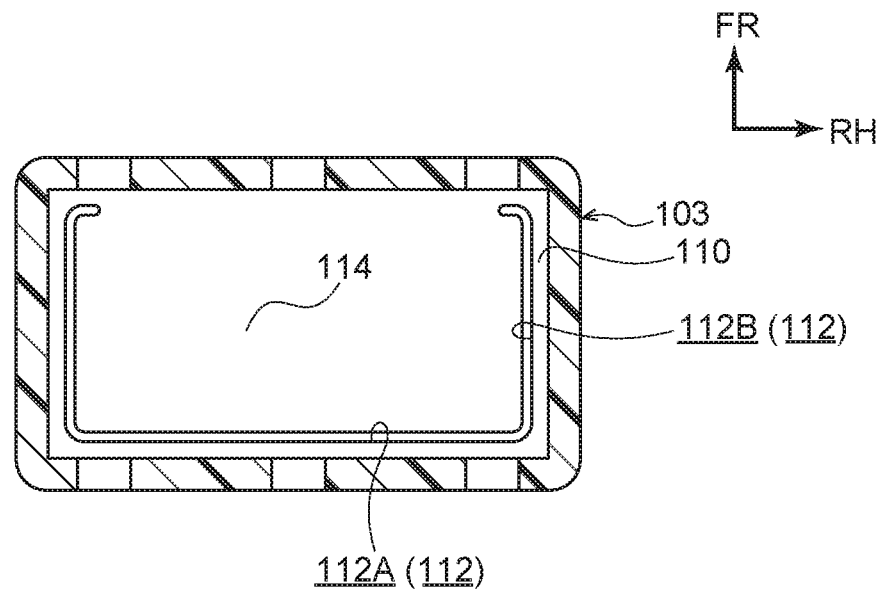
FIG. 9A is an enlarged cross-sectional view corresponding to FIG. 4, showing a knee airbag device as a comparative example.

Here, the planned cleavage portion 60 is formed on the rear side of the intermediate portion 52M in the vehicle front-rear direction of the bottom wall portion 52 of the airbag door portion 50. Further, the planned cleavage portion 60 has a substantially U-shape that is open to the vehicle front side in a plan view. As a result, when the planned cleavage portion 60 is torn open due to the inflation pressure of the knee airbag 20, the portion of the bottom wall portion 52 on the rear side of the intermediate portion 52M is opened to the vehicle lower side to form the door portion 58. Then, as indicated by the arrow R in FIG. 5, a reaction force can be applied from the door portion 58 to the knee airbag 20 toward the vehicle rear side and the vehicle upper side. This action is explained with reference to the comparative example of FIG. 9.

Figure 9B:
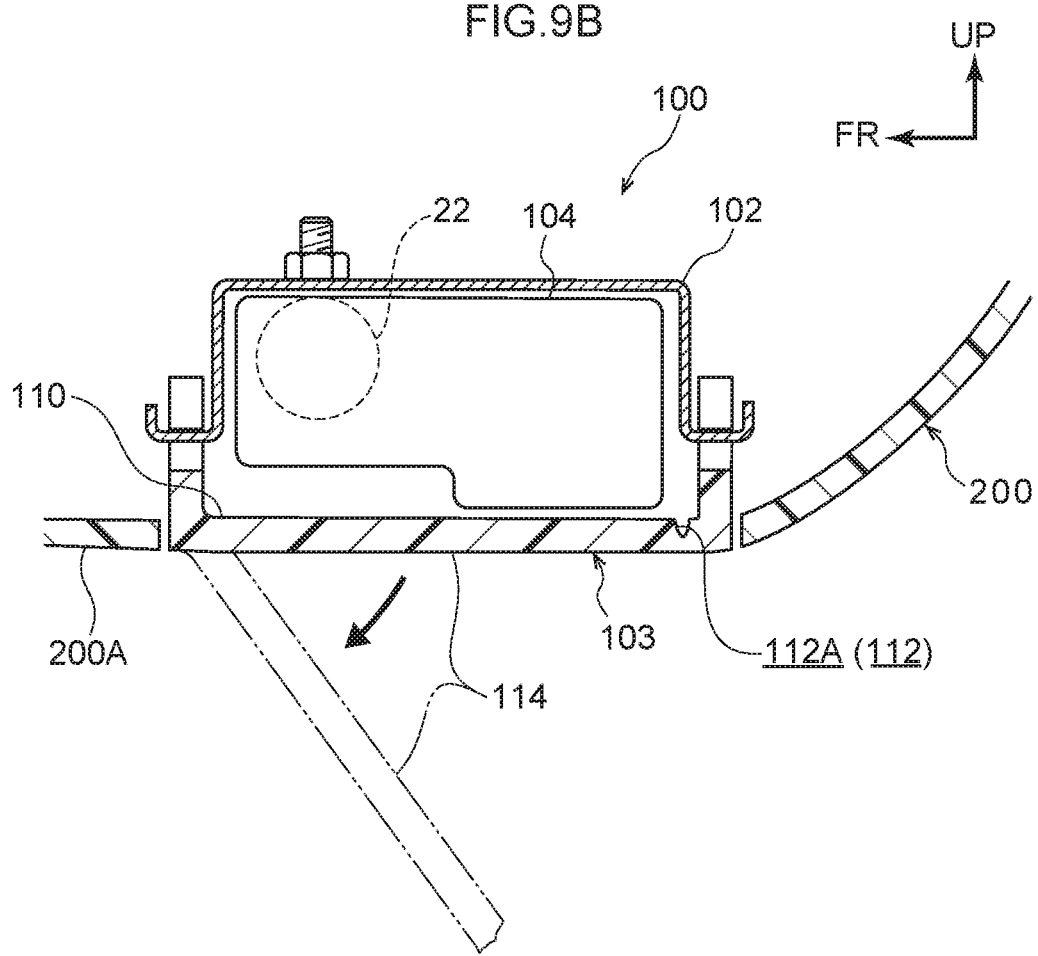
FIG. 9B is an enlarged cross-sectional view corresponding to FIG. 3 showing the airbag door portion shown in FIG. 9A.

As shown in FIG. 9B, the knee airbag device 100 of the comparative example includes an airbag case 102 and an airbag door portion 103. The airbag case 102 is arranged at the lower surface portion 200A of the instrument panel 200. The airbag door portion 103 is formed integrally with the lower surface portion 200A. A knee airbag 104 and an inflator 22 are housed inside the airbag case 102. Further, the knee airbag 104 is inflated and deployed toward the vehicle rear side by receiving gas supply from the inflator 22.

On the other hand, the airbag door portion 103 that constitutes the vehicle lower side of the knee airbag device 100 is formed in a substantially box shape that is open to the vehicle upper side. A wall on the vehicle lower side of the airbag door portion 103 is composed of a bottom wall portion 110. The bottom wall portion 110 is provided with a substantially U-shaped cleavage scheduled portion 112 that is open to the vehicle front side in a plan view over substantially the entire area of the bottom wall portion 110. Specifically, the scheduled cleavage portion 112 includes a first scheduled cleavage portion 112A extending in the vehicle width direction along the edge of the bottom wall portion 110 at the vehicle rear side. In addition, the scheduled cleavage portion 112 includes a second scheduled cleavage portion 112B that extends along the vehicle front-rear direction from both ends of the first scheduled cleavage portion 112A in the vehicle width direction toward the front end portion of the bottom wall portion 110. As a result, when the inflation pressure of the knee airbag 104 acts on the bottom wall portion 110, the scheduled cleavage portion 112 is ruptured or cleaved, and substantially the entire area of the bottom wall portion 110 becomes the door portion 114. Then, when knee airbag device 100 operates, as shown by a two-dot chain line in FIG. 9B, the vehicle front side end portion of bottom wall portion 110 is bent and deformed, and door portion 114 opens toward the vehicle lower side.

Here, in order to improve the robustness of the knee airbag 104 when inflated and deployed, a reaction force from the door portion 114 toward the vehicle rear side and the vehicle upper side is provided. However, the knee airbag device 100 of the comparative example does not include a configuration for restricting the opening angle of the door portion 114. Therefore, when the door portion 114 is opened more than necessary, it is difficult to apply a sufficient reaction force to the knee airbag 104 toward the vehicle rear side and the vehicle upper side.

On the other hand, in the knee airbag device 10 of the present embodiment, a portion of the bottom wall portion 52 on the rear side of the intermediate portion 52M is opened as the door portion 58. As a result, a part of the load in the vehicle downward direction input from knee airbag 20 to bottom wall portion 52 can be received at the vehicle front side of intermediate portion 52M. Further, the expansion operation of the knee airbag 20 can be guided to the rear of the intermediate portion 52M of the bottom wall portion 52. Further, when the planned cleavage part 60 of the bottom wall portion 52 is ruptured or cleaved and the intermediate portion 52M is bent and deformed to open the door portion 58, a part of the load input from the knee airbag 20 to the door portion 58 can be absorbed. As a result, as indicated by the arrow R in FIG. 5, the opening angle of the door portion 58 can be restricted and a reaction force can be applied from the door portion 58 to the knee airbag 20 toward the vehicle rear side and the vehicle upper side. As a result, the robustness of the knee airbag 20 when inflated and deployed can be improved.

Further, in the present embodiment, as compared with the configuration in which the vehicle front side end portion of the bottom wall portion 110 is bent and deformed to open the door portion 114 as in the comparative example described above, a door portion 58, which is a reaction force surface to apply a reaction force to the knee airbag 20, is arranged on the vehicle rear side. As a result, the knee airbag 20 can be inflated and deployed toward the vehicle rear side—that is, the occupant P side—and the robustness of the knee airbag 20 can be improved.

Further, in the present embodiment, the first rib 64 is arranged on the vehicle front side of the end portion 60B1 of the planned cleavage portion 60 and in proximity to the end portion 60B1. In addition, the first rib 64 extends along the vehicle width direction. As a result, in the bottom wall portion 52, since the vicinity of the hinge portion 62 of the door portion 58 is reinforced by the first rib 64, it is possible to prevent or suppress a situation in which the bottom wall portion 52 is ruptured toward the vehicle front side beyond the planned cleavage portion 60 by the inflation pressure of the knee airbag 20.

Further, in the present embodiment, the end portion 60B1 of the second planned cleavage portion 60B in the planned cleavage portion 60 is bent inward in the vehicle width direction. As a result, when the second planned cleavage portion 60B is ruptured or cleaved from the vehicle rear end portion to the end portion 60B1, the cleavage direction at the end portion 60B1 is changed to the vehicle width direction inner side. As a result, it is possible to prevent or prevent a situation in which the bottom wall portion 52 is ruptured toward the vehicle front side beyond the end portion 60B1 by the inflation pressure of the knee airbag 20.

Further, in the present embodiment, the bottom wall portion 52 is formed in a dome shape that is convex toward the vehicle lower side. As a result, compared with a configuration in which the bottom wall portion is formed in a flat plate shape, it is possible to suppress an increase in the plate thickness of the bottom wall portion 52 and to increase resistance when the intermediate portion 52M of the bottom wall portion 52 is bent and deformed. As a result, the opening angle of the door portion 58 can be regulated and an increase in weight of the airbag door portion 50 can be suppressed.

Further, in the present embodiment, the proof stress of the front wall 36 of the airbag case 30 against the inflation pressure of the knee airbag 20 is set higher than that of the rear wall 38. As a result, when the inflation pressure of the knee airbag 20 acts on the front wall 36 and the rear wall 38 of the airbag case 30, the rear wall 38 having low yield strength can be deformed toward the vehicle rear side. As a result, the door opening formed in the bottom wall portion 52 after the planned cleavage portion 60 is opened is enlarged toward the vehicle rear side as the rear wall 38 is deformed. Then, the knee airbag 20 is inflated and deployed to the vehicle rear side and the vehicle upper side, and the knee airbag 20 is smoothly deployed between the instrument panel 14 and the knee portion K of the occupant P.

A boundary portion between the bottom wall portion 52 and the front vertical wall portion 54 of the airbag door portion 50 is reinforced by the second rib 66. As a result, the deformation resistance of the portion of the bottom wall portion 52 on the front side of the intermediate portion 52M against the inflation pressure of the knee airbag 20 is increased. As a result, a larger amount of inflation pressure can be received in the portion of the bottom wall portion 52 on the front side of the intermediate portion 52M, and the reaction force applied from the bottom wall portion 52 to the knee airbag 20 is increased and robustness at the time of inflation and deployment is improved.

Further, in the above embodiment, a knee airbag device 70 according to a modified example shown in FIG. 6 may be applied. The knee airbag device 70 is characterized in that it is configured to utilize a plate thickness difference of the bottom wall portion 74 of the airbag door portion 72 to prevent or suppress the bottom wall portion 74 from being ruptured toward the vehicle front side beyond the intermediate portion 74M in the vehicle front-rear direction. The remainder of the configuration is the same as that of the foregoing embodiment.

As shown in FIG. 6, the airbag door portion 72 is formed in a substantially box shape that is open to the vehicle upper side. Further, in the airbag door portion 72, the bottom wall portion 74 that constitutes a wall at the vehicle lower side is provided with a planned cleavage portion 60 similar to that of the above-described embodiment at a portion rearward of the intermediate portion 74M in the vehicle front-rear direction. Further, the end portion 60B1 on the vehicle front side of the planned cleavage portion 60 serves as a hinge portion 62 of a door portion 78.

Here, the bottom wall portion 74 is configured such that the plate thickness t1 of a portion at the front side of the intermediate portion 74M in the vehicle front-rear direction is thicker than the plate thickness t2 of the door portion 78 forming a portion at the rear side of the intermediate portion 74M. As a result, the bottom wall portion 74 is configured such that the rigidity of the portion on the front side of the intermediate portion 74M in the vehicle front-rear direction is higher than the rigidity of the door portion 78 forming the portion on the rear side of the intermediate portion 74M.

The above-described configuration basically follows the configuration of the above-described embodiment, and therefore exhibits the same operation and effect.

Here, in the knee airbag device 70 according to the first modification, the portion of the bottom wall portion 74 on the vehicle front side of the intermediate portion 74M has a higher rigidity than the portion on the vehicle rear side of the intermediate portion 74M. Accordingly, in the bottom wall portion 74, the rigidity of the portion of the door portion 78 on the vehicle front side of the hinge portion 62 is increased. As a result, it is possible to prevent or suppress a situation where the bottom wall portion 74 is ruptured beyond the planned cleavage portion 60 by the inflation pressure of the knee airbag 20.

Further, in the above embodiment, a knee airbag device 80 according to another modified example shown in FIG. 7 may be applied. The knee airbag device 80 is characterized in that it is configured to utilize a plate thickness difference between a front wall 84 and a rear wall 86 of an airbag case 82 such that the proof pressure of the knee airbag 20 against the inflation pressure is higher in the front wall 84 than in the rear wall 86. The remainder of the configuration is the same as that of the foregoing embodiment.

As shown in FIG. 7, the airbag case 82 constitutes the vehicle upper side of the knee airbag device 80, and is formed in a substantially box shape opened to the vehicle lower side. Further, the plate thickness t3 of the front wall 84 that constitutes the vehicle front side wall of the airbag case 82 is set to be thicker than the plate thickness t4 of the rear wall 86 that constitutes the vehicle rear side wall of the airbag case 82. As a result, the proof stress of the front wall 84 against the inflation pressure of the knee airbag 20 is set higher than the proof stress of the rear wall 86.

Although the front wall 84 is illustrated as a single plate member in FIG. 7, the present disclosure is not limited to this, and the front wall 84 may be formed by stacking and joining a plurality of plate members. In this case, the total plate thickness of the front wall 84 is formed thicker than the plate thickness of the rear wall 86.

The above-described configuration basically follows the configuration of the above-described embodiment, and therefore exhibits the same operation and effect.

In the knee airbag device 80 according to the second modification, the front wall 84 and the rear wall 86 have different plate thicknesses, so that the proof stress of the front wall 84 against the inflation pressure of the knee airbag 20 is set higher than the proof stress of the rear wall 86. As a result, as shown by the two-dot chain line in FIG. 7, when the inflation pressure of the knee airbag 20 acts on the front wall 84 and the rear wall 86 of the airbag case 82, the rear wall 86 having low yield strength can be deformed toward the vehicle rear side. As a result, the door opening formed in the bottom wall portion 52 after the planned cleavage portion 60 is opened is enlarged toward the vehicle rear side as the rear wall 86 is deformed. As a result, the knee airbag 20 is inflated and deployed to the vehicle rear side and the vehicle upper side more easily, and the knee airbag 20 can be smoothly deployed between the instrument panel 14 and the knee portion K of the occupant P.

Further, in the above embodiment, a knee airbag device 90 according to another modified example shown in FIG. 8 may be applied. This knee airbag device 90 is characterized in that a slit portion 99 is formed at the boundary portion between a rear wall 94 and a side wall 96. The rear wall 94 constitutes a wall of the airbag case 92 at the vehicle rear side. The rear wall 94 constitutes a wall of the airbag case 92 at both sides in the vehicle width direction. The remainder of the configuration is the same as that of the foregoing embodiment. In FIG. 8, the instrument panel 14 and the airbag door portion 50 are omitted from the drawing.

As shown in this drawing, a boundary portion between the rear wall 94 and the side wall 96 constitutes a rear corner portion of the substantially box-shaped airbag case 92 that is open to the vehicle lower side. The slit portion 99 extends in the vehicle vertical direction from the lower end portion of the side wall 96 forming a corner portion to the middle portion. As a result, the proof stress of a front wall 98 against the inflation pressure of the knee airbag 20 is set higher than the proof stress of the rear wall 94.

The above-described configuration basically follows the configuration of the above-described embodiment, and therefore exhibits the same operation and effect.

Here, in the knee airbag device 90 according to the modified example, by forming the slit portion 99 at the boundary portion between the rear wall 94 and the side wall 96, the proof stress of the front wall 98 against the inflation pressure of the knee airbag 20 is set higher than the proof stress of the rear wall 94. As a result, when the inflation pressure of the knee airbag 20 acts on the front wall 98 and the rear wall 94 of the airbag case 92, the rear wall 94 having low yield strength can be deformed toward the vehicle rear side. As a result, the door opening formed in the bottom wall portion 52 after the planned cleavage portion 60 is ruptured is enlarged toward the vehicle rear side as the rear wall 94 is deformed. As a result, the knee airbag 20 is inflated and deployed to the vehicle rear side and the vehicle upper side more easily, and the knee airbag 20 can be smoothly deployed between the instrument panel 14 and the knee portion K of the occupant P.

As described above, the configurations of the above-described embodiment and various modifications can be appropriately combined. Further, in the above embodiment, the first rib 64 and the second rib 66 are provided on the bottom wall portion 52 of the airbag case 30, but the configuration may be such that one or both of the first rib 64 and the second rib 66 is not provided.

Further, in the present embodiment, the knee airbag devices 10, 70, 80, 90 are arranged on the driver seat side of the instrument panel 14, but the present disclosure is not limited to this. The knee airbag devices 10, 70, 80, 90 may be arranged on the passenger seat side of the instrument panel 14.

Further, in the above embodiment, the instrument panel 14 and the airbag door portion 50 are separate bodies, but the present disclosure is not limited to this. The airbag door portion 50 may be formed integrally with the lower surface portion 15B of the instrument panel 14.

What is claimed is:

1. A knee airbag device, comprising:
an airbag case disposed at a lower face part of an instrument panel;
a knee airbag accommodated within the airbag case in a folded state, the knee airbag inflating and deploying toward a vehicle rear side and a vehicle upper side upon being supplied with gas; and
an airbag door part disposed at a vehicle lower side of the airbag case, the airbag door part having a substantially U-shaped rupture target part, the rupture target part is open toward a vehicle front side as seen in a plan view, at a portion of a bottom wall part configuring a vehicle lower side face of the airbag door part, disposed rearward of an intermediate part of the airbag door part in a vehicle front-rear direction, and the portion of the bottom wall part disposed rearward of the intermediate part opening toward a vehicle lower side upon rupture of the rupture target part caused by inflation pressure of the knee airbag, a first rib formed at the bottom wall part, the first rib disposed at a vehicle front side of a vehicle front side end part of the rupture target part and in proximity to the vehicle front side end part of the rupture target part, and the first rib extending along a vehicle width direction.

2. The knee airbag device of claim 1, wherein the bottom wall part is configured such that a plate thickness of a portion at a vehicle front side of the intermediate part is larger than a plate thickness of a portion at a vehicle rear side of the intermediate part.

3. The knee airbag device of claim 1, wherein the bottom wall part is configured in a dome shape that is convex toward a vehicle lower side.

4. The knee airbag device of claim 1, wherein the airbag case is configured such that a proof stress, relative to an inflation pressure of the knee airbag, of a front wall configuring a vehicle front side wall of the airbag case is higher than a proof stress, relative to the inflation pressure of the knee airbag, of a rear wall configuring a vehicle rear side wall of the airbag case.

5. The knee airbag device of claim 4, wherein the airbag case comprises a bead formed at the front wall, such that the proof stress, relative to the inflation pressure of the knee airbag, of the front wall is higher than the proof stress, relative to the inflation pressure of the knee airbag, of the rear wall.

6. The knee airbag device of claim 4, wherein the airbag case is configured with the front wall having a larger plate thickness than the rear wall, such that the proof stress, relative to the inflation pressure of the knee airbag, of the front wall is higher than the proof stress, relative to the inflation pressure of the knee airbag, of the rear wall.

7. The knee airbag device of claim 4, wherein the airbag case comprises a slit respectively formed at an end part at one side and at another side, in a vehicle width direction, of the rear wall, such that the proof stress, relative to the inflation pressure of the knee airbag, of the front wall is higher than the proof stress, relative to the inflation pressure of the knee airbag, of the rear wall.

8. The knee airbag device of claim 1, wherein the airbag door part comprises a second rib extending across from the bottom wall part to a front vertical wall part that stands upright toward a vehicle upper side from an end part at a vehicle front side of the bottom wall part.

9. The knee airbag device of claim 1, wherein:
the rupture target part comprises a first rupture target part extending in a vehicle width direction along an edge part at a vehicle rear side of the bottom wall part, and a pair of second rupture target parts respectively extending toward a vehicle front side from an end part at one side and an end part at another side, in the vehicle width direction, of the first rupture target part; and
an end part at a vehicle front side of each of the pair of second rupture target parts is bent and extends towards an inner side in the vehicle width direction.

10. The knee airbag device of claim 1, wherein the knee airbag is accommodated in the airbag case in a state in which a portion that inflates upon receipt of gas supply is disposed at a vehicle rear side of an inflator.

11. The knee airbag device of claim 1, wherein the airbag door part is configured as a separate body from the instrument panel and is modularized in a state in which the airbag door part is coupled with the airbag case.

12. The knee airbag device of claim 1, wherein the first rib extends across from the bottom wall part of the airbag door part to a side wall part that stands upright toward a vehicle upper side from an end part, in the vehicle width direction, of the bottom wall part, the first rib being formed integrally with the bottom wall part and the side wall part.

13. A knee airbag device, comprising:

an airbag case disposed at a lower face part of an instrument panel;

a knee airbag accommodated within the airbag case in a folded state, the knee airbag inflating and deploying toward a vehicle rear side and a vehicle upper side upon being supplied with gas; and an airbag door part disposed at a vehicle lower side of the airbag case, the airbag door part having a substantially U-shaped rupture target part, the rupture target part is open toward a vehicle front side as seen in a plan view, at a portion of a bottom wall part configuring a vehicle lower side face of the airbag door part, disposed rearward of an intermediate part of the airbag door part in a vehicle front-rear direction, and the portion of the bottom wall part disposed rearward of the intermediate part opening toward a vehicle lower side upon rupture of the rupture target part caused by inflation pressure of the knee airbag, a second rib extending across from the bottom wall part to a front vertical wall part that stands upright toward a vehicle upper side from an end part at a vehicle front side of the bottom wall part.

14. The knee airbag device of claim 13, wherein the bottom wall part is configured such that a plate thickness of a portion at a vehicle front side of the intermediate part is larger than a plate thickness of a portion at a vehicle rear side of the intermediate part.

15. The knee airbag device of claim 13, wherein the bottom wall part is configured in a dome shape that is convex toward a vehicle lower side.

16. The knee airbag device of claim 13, wherein the airbag case is configured such that a proof stress, relative to an inflation pressure of the knee airbag, of a front wall configuring a vehicle front side wall of the airbag case is higher than a proof stress, relative to the inflation pressure of the knee airbag, of a rear wall configuring a vehicle rear side wall of the airbag case.

17. The knee airbag device of claim 1, wherein:

the rupture target part comprises a first rupture target part extending in a vehicle width direction along an edge part at a vehicle rear side of the bottom wall part, and a pair of second rupture target parts respectively extending toward a vehicle front side from an end part at one side and an end part at another side, in the vehicle width direction, of the first rupture target part; and an end part at a vehicle front side of each of the pair of second rupture target parts is bent and extends towards an inner side in the vehicle width direction.

18. The knee airbag device of claim 13, wherein the knee airbag is accommodated in the airbag case in a state in which a portion that inflates upon receipt of gas supply is disposed at a vehicle rear side of an inflator.

19. The knee airbag device of claim 13, wherein the airbag door part is configured as a separate body from the instrument panel and is modularized in a state in which the airbag door part is coupled with the airbag case.

* * * * *